(12) United States Patent  
Higashitani et al.

(10) Patent No.: US 11,292,441 B2
(45) Date of Patent: Apr. 5, 2022

(54) VEHICLE CONTROL DEVICE

(71) Applicant: DENSO CORPORATION, Kariya (JP)

(72) Inventors: Mitsuharu Higashitani, Kariya (JP); Noriaki Ikemoto, Kariya (JP); Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 16/364,785

(22) Filed: Mar. 26, 2019

(65) Prior Publication Data

US 2019/0299947 A1 Oct. 3, 2019

(30) Foreign Application Priority Data

Mar. 27, 2018 (JP) .............................. JP2018-060302

(51) Int. Cl.
*B60T 8/17* (2006.01)
*B60T 7/20* (2006.01)
*B60T 13/66* (2006.01)
*B60T 8/18* (2006.01)

(52) U.S. Cl.
CPC .............. *B60T 8/1708* (2013.01); *B60T 7/20* (2013.01); *B60T 13/662* (2013.01); *B60T 8/1887* (2013.01)

(58) Field of Classification Search
CPC ........ B60T 8/1708; B60T 7/20; B60T 13/662; B60T 8/1887; B60T 2201/16; B60T 2210/36; B60T 2260/02; B60T 2201/02; B60T 7/22
See application file for complete search history.

(56) References Cited

U.S. PATENT DOCUMENTS

| 8,983,729 B2* | 3/2015 | Hahne ................... B60T 8/1708 |
| | | 701/42 |
| 2014/0343813 A1* | 11/2014 | Morselli ................. B60T 13/08 |
| | | 701/70 |
| 2015/0203103 A1* | 7/2015 | Kobayashi ............ B60W 10/06 |
| | | 477/3 |
| 2016/0339915 A1 | 11/2016 | Kuwahara et al. |
| 2016/0349755 A1 | 12/2016 | Kuwahara et al. |
| 2017/0235307 A1 | 8/2017 | Asakura et al. |
| 2019/0084540 A1* | 3/2019 | Kasper ..................... G08G 1/22 |
| 2019/0210418 A1* | 7/2019 | Hall ......................... B60D 1/62 |

FOREIGN PATENT DOCUMENTS

| JP | 2003040095 A | 2/2003 |
| JP | 2003081075 A | 3/2003 |
| JP | 2007320358 A | * 12/2007 |
| JP | 2012236557 A | 12/2012 |

* cited by examiner

*Primary Examiner* — Hunter B Lonsberry
*Assistant Examiner* — Jimin You
(74) *Attorney, Agent, or Firm* — Oliff PLC

(57) ABSTRACT

An ECU operating as a vehicle control device, to be mounted on a truck tractor, has a hauling determination part and an automatic driving control part. The truck tractor is hauling/pulling a trailer. The hauling determination part detects whether the trailer is hauled by the truck tractor. The automatic driving control part switches an automatic driving mode between a first automatic driving mode and a second automatic driving mode on the basis of a detection result of the hauling determination part. The first automatic driving mode represents a situation in which the truck tractor is not hauling/pulling the trailer. The second automatic driving mode represents a situation in which the truck tractor is hauling/pulling the trailer.

15 Claims, 17 Drawing Sheets

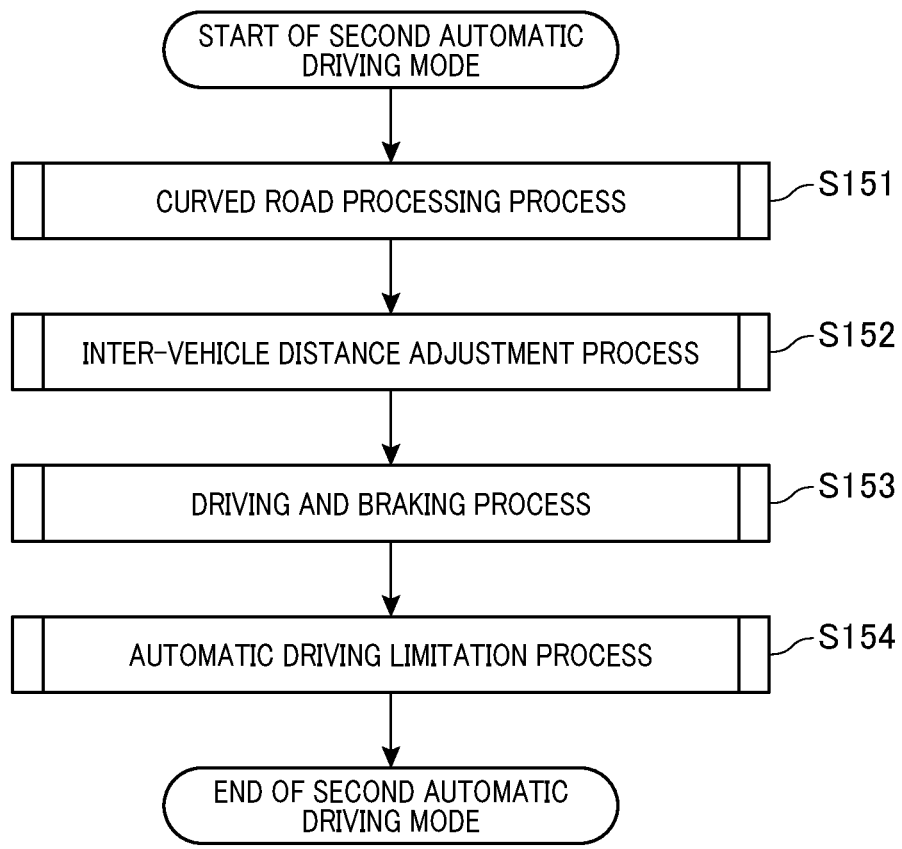

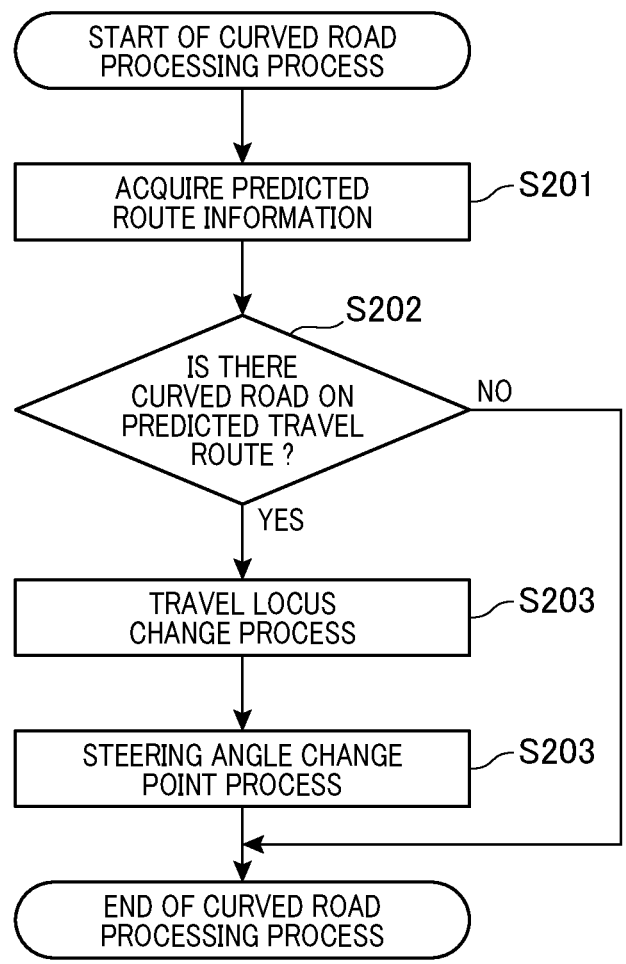

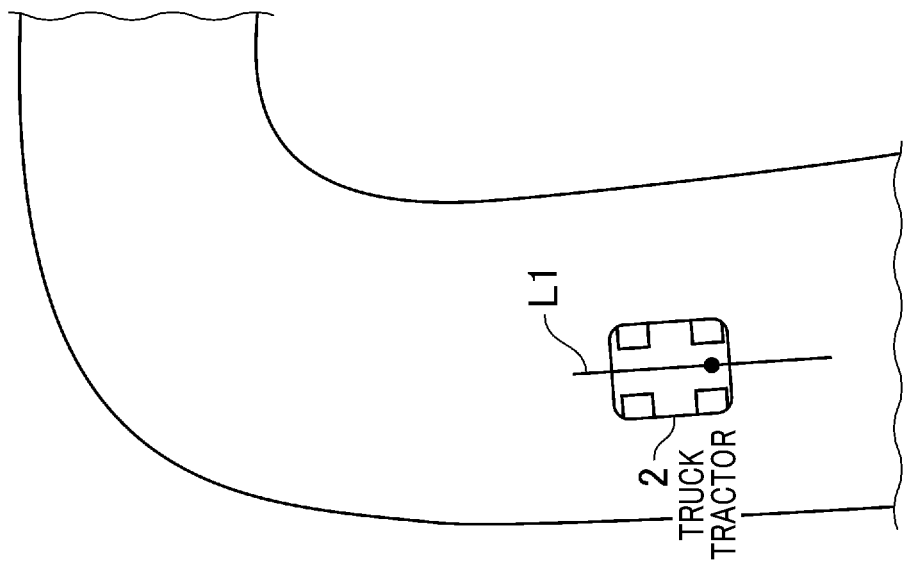
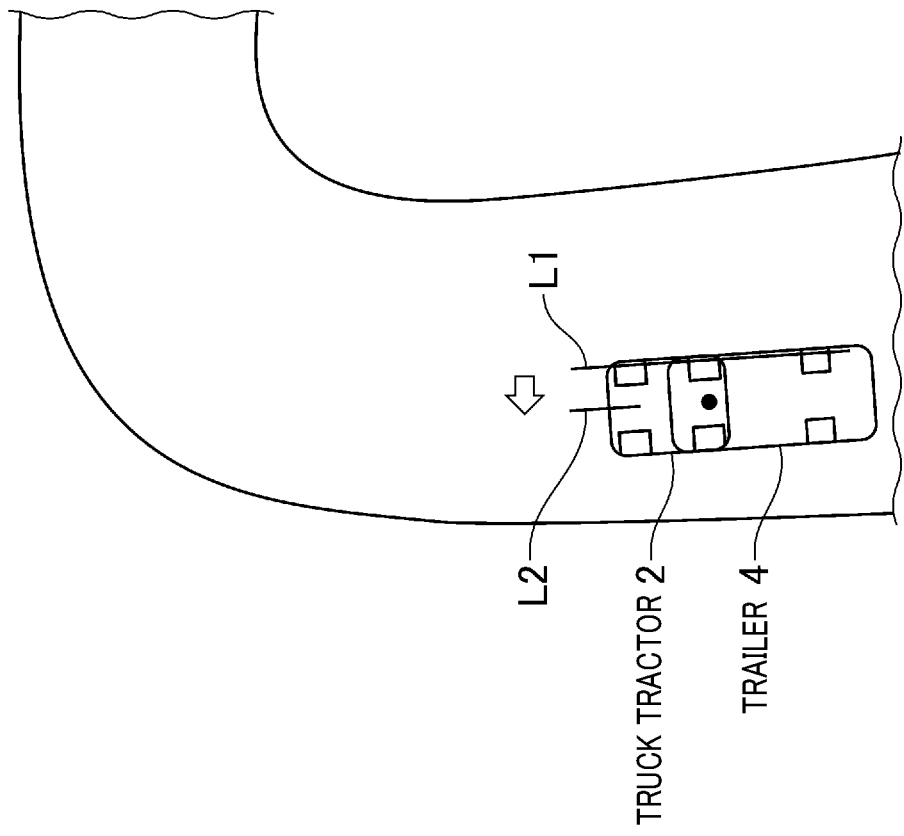

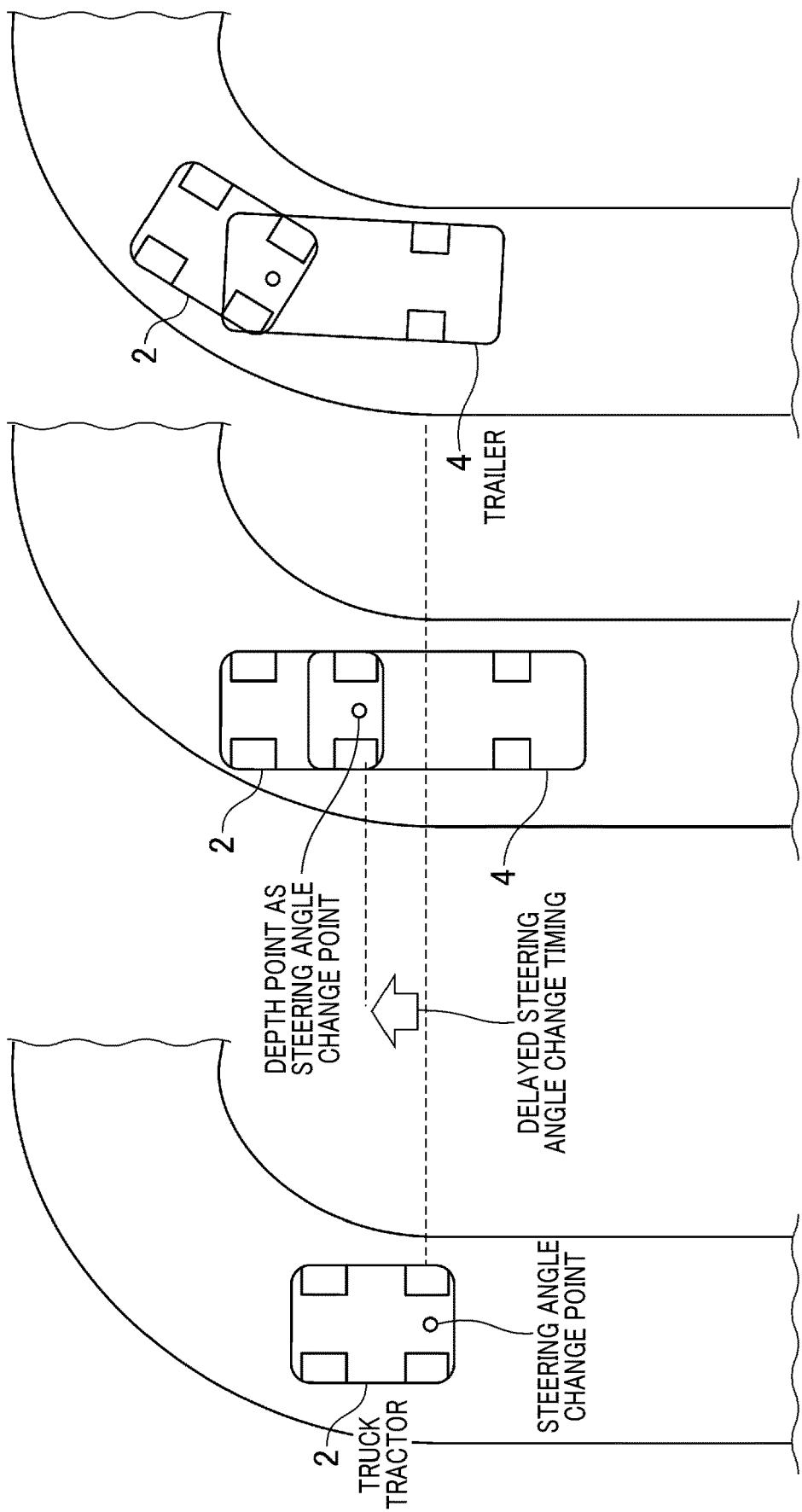

PRECEDING VEHICLE

PRECEDING VEHICLE

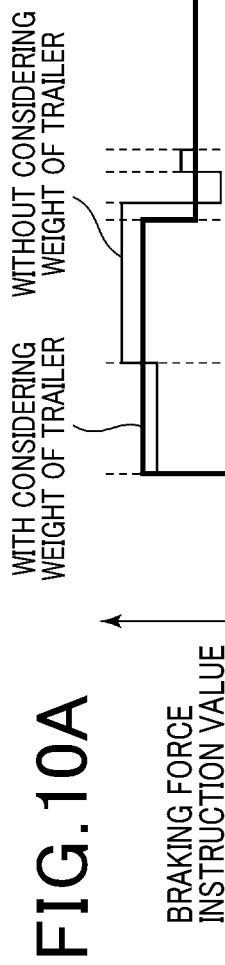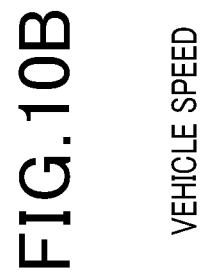

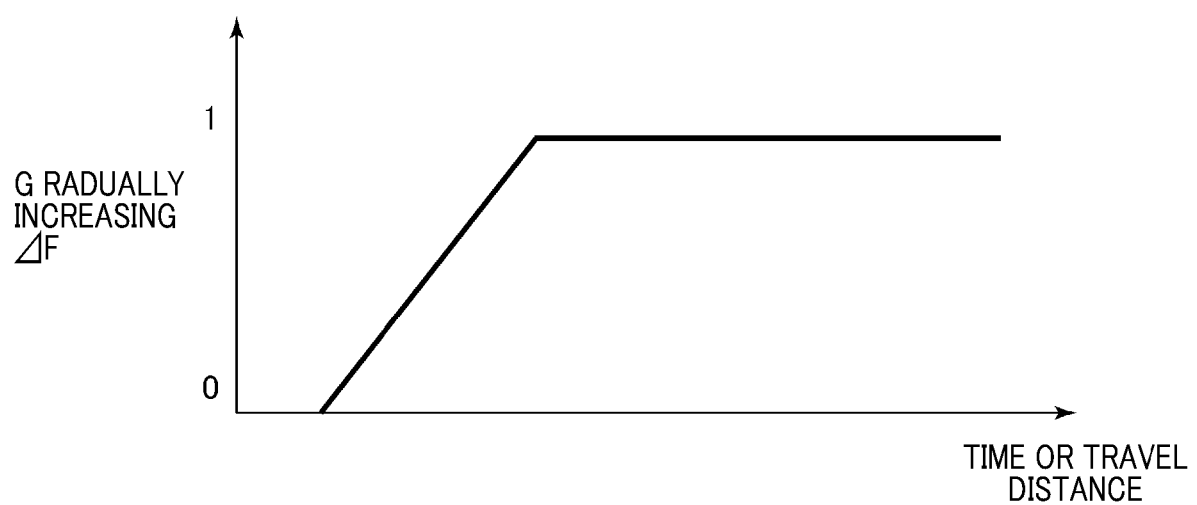

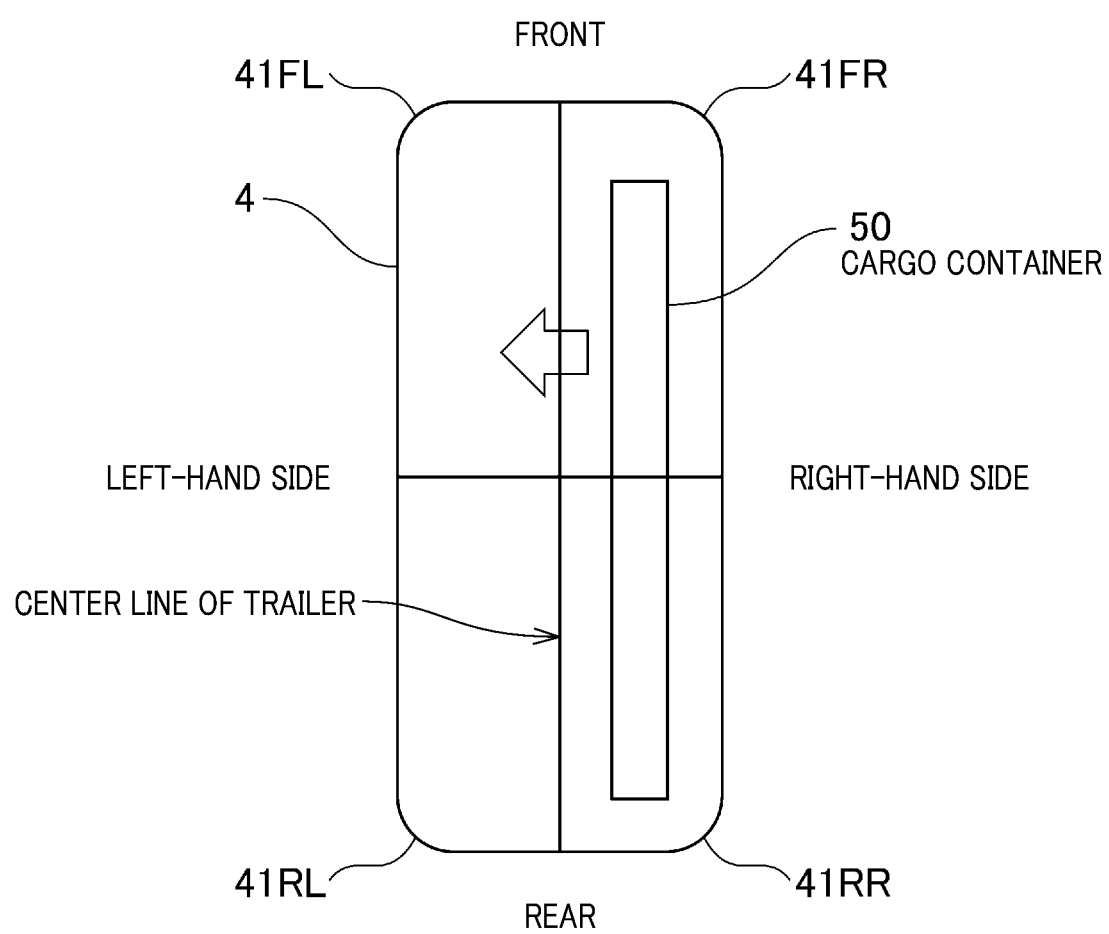

VEHICLE CONTROL DEVICE

CROSS-REFERENCE TO RELATED APPLICATION

This application is related to and claims priority from Japanese Patent Application No. 2018-60302 filed on Mar. 27, 2018, the contents of which are hereby incorporated by reference.

TECHNICAL FIELD

The present disclosure relates to vehicle control devices to be mounted on truck tractors or trucks which haul trailers.

BACKGROUND

There have been proposed vehicle control devices to be mounted on autonomous vehicles or self-driving vehicles. For example, a vehicle control device determines at least one data item of driving force, braking force and a steering angle of a vehicle as target values on the basis of a driving environment of the vehicle or a driving state of the vehicle, and predetermined control parameters, e.g. a vehicle speed, an inter-vehicle distance between the vehicle and a target object, an acceleration, and a driving lane of the vehicle. The vehicle control device performs a drive assist control of the vehicle on the basis of the target values. This drive assist control allows the vehicle to automatically drive without operation of the driver or user of the vehicle.

SUMMARY

It is desired for the present disclosure to provide an exemplary embodiment which provides a vehicle control device. The vehicle control device is mounted on a truck tractor (or a truck) which is hauling/pulling a trailer. The vehicle control device is realized by using a computer system including a central processing unit. The computer system provides a hauling determination part and an automatic driving control part. The hauling determination part detects whether a trailer is being hauled by the truck tractor. The automatic driving control part switches an automatic driving mode between a first automatic driving mode and a second automatic driving mode on the basis of a detection result of the hauling determination part. The first automatic driving mode representing a situation in which the truck tractor is not hauling/pulling the trailer. The second automatic driving mode representing a situation in which the truck tractor is hauling/pulling the trailer.

BRIEF DESCRIPTION OF THE DRAWINGS

A preferred, non-limiting embodiment of the present disclosure will be described by way of example with reference to the accompanying drawings, in which:

FIG. 3 is a flow chart showing in a second automatic driving mode in the vehicle control process shown in FIG. 2;

FIG. 4 is a flow chart showing in a curved road processing process in the second automatic driving mode shown in FIG. 3;

FIG. 5A and FIG. 5B are views explaining a travel locus setting process performed by the vehicle control device according to the exemplary embodiment when the truck tractor enters a curve on a travel road;

FIG. 6A is a view showing a steering angle change point when only the truck tractor with no travel load is traveling at a curve of the road;

FIG. 6B is a view showing a steering angle change point when the truck tractor which is hauling/pulling the trailer is traveling at the curve of the road;

FIG. 6C is a view showing a situation in which the truck tractor which is hauling the trailer is traveling at the curve on the road;

FIG. 10A and FIG. 10B are views explaining the driving process in the driving and braking process shown in FIG. 9;

FIG. 11 is a view explaining the driving process in the driving and braking process shown in FIG. 9;

FIG. 16 is a view showing another situation in which the load is placed at a right-hand side in the trailer and the four weight sensors are provided.

DETAILED DESCRIPTION OF THE PREFERRED EMBODIMENTS

Figure 1:
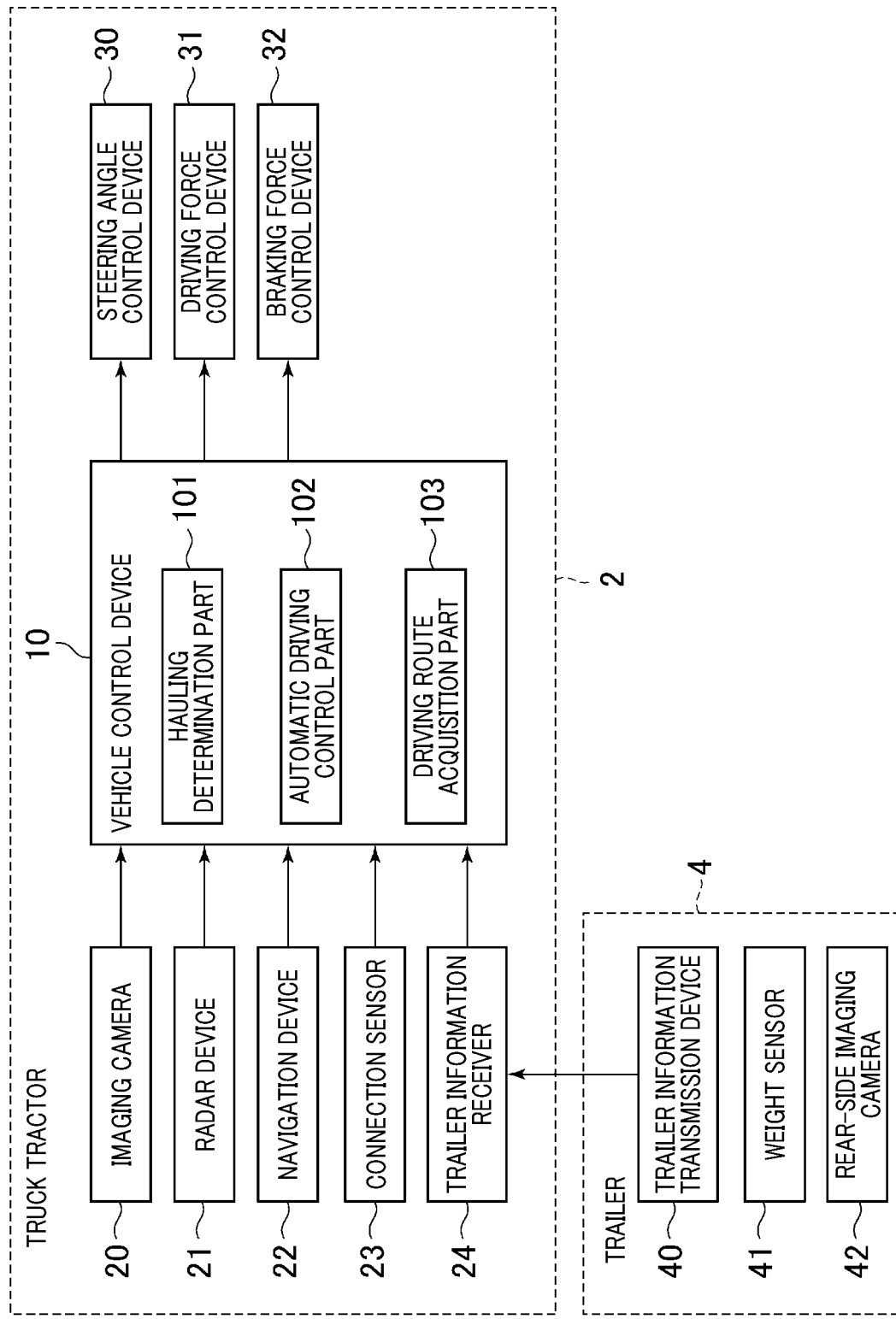
FIG. 1 is a block diagram showing a functional structure of a vehicle control device according to an exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

Exemplary Embodiment

A description will be given of a vehicle control device and a vehicle control process according to an exemplary embodiment of the present disclosure with reference to FIG. 1 to FIG. 17A to FIG. 17D.

FIG. 1 is a block diagram showing a functional structure of the vehicle control device 10 according to the exemplary embodiment of the present disclosure. As shown in FIG. 1, the vehicle control device 10 according to the exemplary embodiment is mounted on a truck tractor 2. The truck tractor 2 hauling a trailer 4 forms a towing automobile. In general, a truck tractor is an engineering vehicle for delivering a high tractive effort (or torque) at slow speeds, for the purposes of hauling a trailer or machinery used in agriculture or construction. There are various types of trailers to be towed by the truck tractor 4 as powered vehicles. For example, the vehicle control device 10 can be applied to a new type of towing automobiles having both the function of a truck tractor and the function of a trailer which convey passengers and/or goods.

The vehicle control device 10 receives detection signals transmitted from an imaging camera 20, a radar device 21, a navigation device 22, a connection sensor 23 and a trailer information receiver 24.

The vehicle control device 10 generates and transmits an instruction signal to a steering angle control device 30, a driving force control device 31 and a braking force control device 32.

As shown in FIG. 1, the imaging camera 20, the radar device 21, the navigation device 22, the connection sensor 23, the trailer information receiver 24, the steering angle control device 30, the driving force control device 31 and the braking force control device 32 are provided on the truck tractor 2.

The imaging camera 20 captures images around the truck tractor 2, generates image data, and transmits the generated image data to the vehicle control device 10. It is sufficient for the truck tractor 2 to have one or more imaging cameras, and to capture images of the surroundings including a forward view image ahead of the truck tractor 2.

The radar device 21 transmits millimeter wavers toward a forward direction of the truck tractor 2 equipped with the vehicle control device 10, and receives reflected waves, which have been reflected by a detection target, for example, vehicles, traffic signs, pedestrians, buildings, etc. The radar device 21 calculates a distance between the detection target and the truck tractor 2 on the basis of the reflected waves. When the detection target is a preceding vehicle travelling ahead of the truck tractor 2, it is possible for the radar device 21 to calculate an inter-vehicle distance between the detection target and the truck tractor 2 on the basis of the reflected waves.

The radar device 21 generates measurement data including a direction of the detection target and a distance on the basis of the received reflected waves, and transmits the generated measurement data to the vehicle control device 10. It is sufficient for the truck tractor 2 to have one or more radar devices so long as the radar device 21 detects targets present in a forward direction ahead of the truck tractor 2.

The navigation device 22 obtains map information, and detects the current location of the truck tractor 2, and obtains a position of the truck tractor 2 on a map. The navigation device 22 acquires shape information of road curve, grade information of road from the map information, and transmits information data including shape information and grade information of a road.

The connection sensor 23 detects a connection state between the truck tractor 2 and the trailer 4. It is acceptable to arrange the connection sensor 23 at any position on the trailer 4 so long as the connection sensor 23 detects at least a connection state between the truck tractor 2 and the trailer 4. The connection state represents whether the truck tractor 2 is connected to the trailer 4. The connection sensor 23 transmits the detected connection state between the truck tractor 2 and the trailer 4 to the vehicle control device 10.

The trailer information receiver 24 receives and acquires trailer data transmitted from the trailer 4. The trailer data represents characteristics data of the trailer 4. The trailer data represents at least one data item of a weight, length, width and height of the trailer 4. The trailer information receiver 24 transmits the acquired the trailer data to the vehicle control device 10.

The trailer 4 has a trailer information transmission device 40, a weight sensor 41 and a rear-side imaging camera 42. The trailer information transmission device 40 transmits the trailer data to the vehicle control device 10. As previously described, the trailer information receiver 24 in the vehicle control device 10 provided on the truck tractor 2 receives the trailer data transmitted from the trailer information transmission device 40 in the trailer 4.

The weight sensor 41 detects a weight of load on the trailer 4. The weight sensor 41 calculates a sum of a weight of the trailer 4 without load and the weight of the load, generates weight information of the trailer 4, and transmits the weight information of the trailer 4 to the trailer information transmission device 40. The rear-side imaging camera 42 captures a rear-side image of the trailer 4, and generates and transmits rear-side image information to the trailer information transmission device 40.

A description will be given of one example of the arrangement of the connection sensor 23 provided on the truck tractor 2 and the rear-side imaging camera 42 provided on the trailer 4 with reference to FIG. 13.

Figure 13:
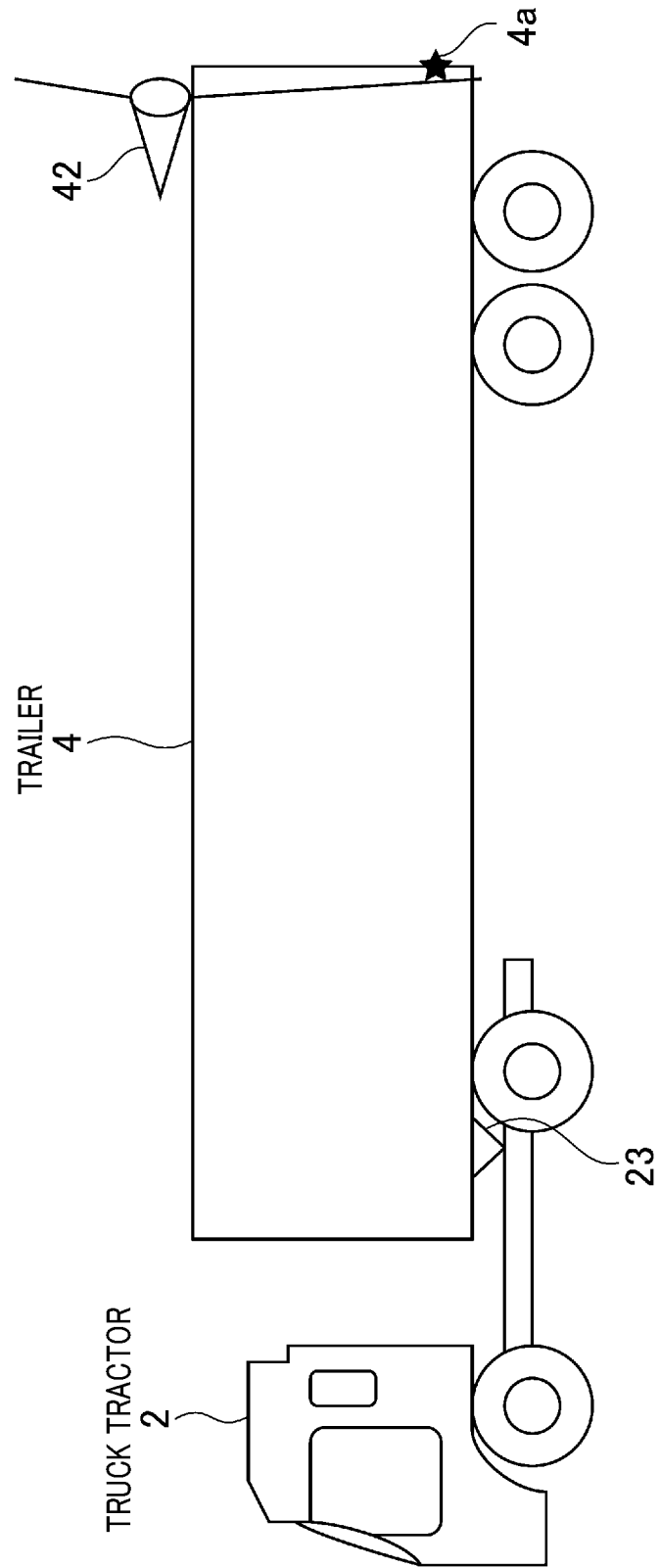
FIG. 13 is a view showing the truck tractor which is hauling/pulling the trailer so as to explain an example of recognizing a rear side of the trailer.

FIG. 13 is a view showing the truck tractor 2 which is hauling/pulling the trailer 4 so as to explain an example of recognizing a rear side of the trailer 4.

As shown in FIG. 13, the connection sensor 23 is arranged at a connection mechanism which connects the truck tractor 2 and the trailer 4. The rear-side imaging camera 42 is arranged upward at a rearmost position of the trailer 4. The rear-side imaging camera 42 is a wide angle imaging camera, and captures an overall rear-side of the trailer 4. An identification mark 4a is plated on the trailer 4. The rear-side imaging camera 42 captures the rear-side image around the identification mark 4a attached to the trailer 4 so as to detect whether there is/are projection objects projected toward the rear-side direction from the trailer 4.

For example, the vehicle control device 10 according to the exemplary embodiment can be realized by using a computer system which is composed of a central processing device (CPU) as an arithmetic part, a random access memory (RAM), a read only memory (ROM), an interface part, through which data transmission is performed.

A description will now be given of various functional elements of the vehicle control device 10 with respect to FIG. 1.

As shown in FIG. 1, the vehicle control device 10 has functional elements, i.e. a hauling determination part 101, an automatic driving control part 102 and a driving route acquisition part 103. The hauling determination part 101 detects whether the truck tractor 2 is hauling/pulling the trailer 4.

The automatic driving control part 102 switches the automatic driving mode between a first automatic driving mode and a second automatic driving mode. The first automatic driving mode represents a situation in which the truck tractor 2 does not haul/pull the trailer 4. The second automatic driving mode represents a situation in which the truck tractor 2 is hauling/pulling the trailer 4.

The automatic driving control part 102 transmits instructions to the steering angle control device 30, the driving force control device 31 and the braking control device 32 so as to control the automatic driving of the truck tractor 2.

The steering angle control device 30 adjusts a steering angle of front wheels of the truck tractor 2. The driving force control device 31 controls behavior of the driving source composed of motors and an engine mounted on the truck tractor 2. The braking force control device 32 controls brake operation of the truck tractor.

When the truck tractor 2 travels while being hauling the trailer 4, the vehicle control device 10 uses various control parameters to be used for performing the drive control and the braking control. The number of the control parameters when the truck tractor 2 is hauling/pulling the trailer 4 is greater than that when the truck tractor 2 is not hauling/pulling the trailer 4, i.e. when only the truck tractor 2 travels. Accordingly, the automatic driving control part 102 switches the automatic driving mode between the first automatic driving mode and the second automatic driving mode on the basis of the detection result of whether the truck tractor 2 is hauling/pulling the trailer 4.

In the second automatic driving mode, the vehicle control device 10 limits the automatic driving performance of the truck tractor 2 when compared with the automatic driving performance in the first automatic driving mode. The reduction of the automatic driving performance contains a situation in which the user (or the driver) of the truck tractor 2 performs a steering operation and an acceleration/deceleration operation of the truck tractor 2, and another situation in which the vehicle control device 10 prohibits the execution of the automatic driving mode, and allows the user of the truck tractor 2 to perform the driving operation of the truck tractor 2. In the exemplary embodiment, the reduction of the automatic driving performance contains a determination of whether at least one of the driving operation, the braking operation, and steering operation is prohibited.

The situation in which the truck tractor 2 is hauling/pulling the trailer 4 increases the number of the control parameters to be used for performing the automatic driving control operation. This increases the difficulty of performing the automatic driving of the truck tractor 2.

In the second automatic driving mode in which the truck tractor 2 is hauling/pulling the trailer 4, the vehicle control device 10 limits the automatic driving function. This makes it possible to safely control driving of the truck tractor 2. That is, this control makes it possible to allow the truck tractor 2 to safely continue the automatic driving, and to allow the driver of the truck tractor 2 to perform the manual operation of the truck tractor 2.

There is a situation in which the truck tractor 2 is connected with the trailer 4 through a connection pin (as a connection mechanism). In this situation, it is possible to perform the safe driving of the truck tractor 2 when the driver operates the truck tractor 2 at a low vehicle speed. That is, the reduction of the automatic driving performance includes concepts of suppression of the vehicle speed, and the suppression of the steering angle change and the steering speed.

In the structure of the vehicle control device 10 according to the exemplary embodiment, the hauling determination part 101 receives trailer data, i.e. at least one data item of the weight, length, width and height of the trailer 4. When at least one data item of the weight, length, width and height of the trailer 4 exceeds a respective predetermined threshold value, the automatic driving control part 102 limits the execution of the automatic driving control operation in the second automatic driving mode. It is possible for the hauling determination part 101 to receive and acquire the trailer data on the basis of weight information and the rear-side image information transmitted from the trailer information transmission device 40.

When the trailer 4 is hauled by the truck tractor 2 (i.e. in the second automatic driving mode) and at least one data item of the weight, length, width and height of the trailer 4 exceeds a respective predetermined threshold value, the automatic driving control part 102 determines a degree of limitation control which limits the execution of the automatic driving control operation. The limitation control makes it possible to allow the driver of the truck tractor 2 to perform the manual driving operation of the truck tractor 2 and to take countermeasures against danger caused by performing the full automatic driving control operation. For example, it is possible for the driver of the truck tractor 2 to stop the truck tractor 2 moving.

In the vehicle control device 10 according to the exemplary embodiment, the hauling determination part 101 receives and acquires the trailer data, i.e. at least one data item of the weight, length, width and height of the trailer 4. The automatic driving control part 102 determines the degree of the limitation control of the truck tractor 2 to be used in the second automatic driving mode.

It is accordingly possible for the automatic driving control part 102 to estimate the behavior of the trailer 4 with high accuracy on the basis of the trailer data transmitted from the trailer 4 side, and to perform the second automatic driving mode with high accuracy.

The vehicle control device 10 according to the exemplary embodiment further has the driving route acquisition part 103 (see FIG. 1). The driving route acquisition part 103 acquires predicted route information regarding a road shape of a predicted travel route on which the truck tractor 2 will travel. The automatic driving control part 102 performs the steering control on the basis of the trailer data and the predicted route information when the truck tractor 2 enters a curved road having a curvature of not less than a predetermined curvature. That is, the automatic driving control part 102 performs the steering control so that a travel locus of the towing automobile (composed of the truck tractor 2 and the trailer 4) in the second automatic driving mode becomes different from a travel locus of the towing automobile in the first automatic driving mode.

In general, the travel locus of the truck tractor 2 and the trailer 4 when the truck tractor 2 is hauling/pulling the trailer 4 is different from the travel locus of the truck tractor 2 when the truck tractor 2 is not hauling/pulling the truck tractor 2. This difference in travel locus between the first automatic driving mode and the second automatic driving mode varies due to a length of the trailer 4.

The automatic driving control part 102 in the vehicle control device 10 according to the exemplary embodiment performs the steering control on the basis of the received trailer data and the predicted route information so that the travel locus in the second automatic driving mode becomes different from the travel locus of the first automatic driving mode. This steering control makes it possible for the truck tractor 2 to perform correct driving control along the appropriate travel locus when the truck tractor 2 is hauling/pulling the trailer 4.

In the structure of the vehicle control device 10 according to the exemplary embodiment, the automatic driving control part 102 performs steering control so that the travel locus in the second automatic driving mode becomes closer to the outside of a curved road than the travel locus in the first automatic driving mode when the truck tractor 2 enters the curved road.

When the truck tractor 2 is hauling/pulling the trailer 4, it is possible to keep a more inside area of the curved road, in which the truck tractor 2 and the trailer 4 travel smoothly because the truck tractor 2 is driving closer to the outside of the curved road at the entrance of the curved road. This control makes it possible to reduce a probability of causing a driving lane departure and a collision between the towing automobile (truck tractor (or truck) 2 and the trailer 4) and objects (for example, pedestrians, other vehicles, etc.) due to an inner wheel difference to be as small as possible when the truck tractor (track) 2 makes a right turn or a left turn.

In the structure of the vehicle control device 10 according to the exemplary embodiment, the automatic driving control part 102 determines at least one data item of a steering angle operation value and an operation timing in the second automatic driving mode on the basis of the obtained trailer data.

When the truck tractor 2 is hauling/pulling the trailer 4, because the automatic driving control part 102 determines at least one data item of the steering angle operation value and the operation timing in the second automatic driving mode so as to correctly adopt the hauling state, this makes it possible to perform the steering operation while correctly considering an inner wheel difference when the truck tractor (track) 2 makes a right turn or a left turn.

In the structure of the vehicle control device 10 according to the exemplary embodiment, the automatic driving control part 102 determines a target value of an inter-vehicle distance between the truck tractor 2 and a preceding vehicle in the second automatic driving mode on the basis of the trailer data regarding the weight of the trailer 4 transmitted from the trailer information transmission device 40, which becomes longer than the inter-vehicle distance between the truck tractor 2 and the preceding vehicle in the first automatic driving mode.

The necessary braking distance in the second automatic driving mode in which the truck tractor 2 is hauling/pulling the trailer 4 becomes longer than a necessary braking distance in the first automatic driving mode. The degree of increase of the necessary braking distance varies due to the weight of the trailer 4. Accordingly, the automatic driving control part 102 increases the target value of the inter-vehicle distance, between the truck tractor 2 and the preceding vehicle in the second automatic driving mode on the basis of the degree determined by the trailer data, more than the target value of the inter-vehicle distance determined in the first automatic driving mode in which the truck tractor 2 is not hauling/pulling the trailer 4. This control makes it possible to allow the driver of the truck tractor 2 to perform safe driving.

In the structure of the vehicle control device 10 according to the exemplary embodiment, the automatic driving control part 102 determines at least one data item of a driving operation value and a driving operation timing on the basis of the weight of the trailer 4 represented by the obtained trailer data in the second automatic driving mode.

When the trailer 4 is hauled by the truck tractor 2 in the second automatic driving mode, an acceleration responsiveness of the vehicle control device 10 mounted on the truck tractor 2 varies due to a magnitude of the weight of the trailer 4. The automatic driving control part 102 in the vehicle control device 10 determines the driving operation value and the driving operation timing on the basis of the weight of the trailer 4 represented by the obtained trailer data. This control makes it possible to increase the acceleration responsiveness of the trailer 4.

In the structure of the vehicle control device 10 according to the exemplary embodiment, the automatic driving control part 102 determines at least one data item of a braking operation value and a braking operation timing on the basis of the weight information of the trailer 4 as the obtained trailer data in the second automatic driving mode.

When the trailer 4 is hauled by the truck tractor 2 in the second automatic driving mode, a brake responsiveness of the vehicle control device 10 mounted on the truck tractor 2 varies due to a magnitude of the weight of the trailer 4. The automatic driving control part 102 in the vehicle control device 10 determines the braking operation value and the braking operation timing on the basis of the weight of the trailer 4. This control makes it possible to increase the brake responsiveness of the trailer 4.

In the structure of the vehicle control device 10 according to the exemplary embodiment, the automatic driving control part 102 limits the automatic driving control operation in the second automatic driving mode when at least one data item of the weight, length, width and height of the trailer 4 as the obtained trailer data exceeds a respective predetermined value.

When the trailer 4 is hauled by the truck tractor 2 (i.e. in the second automatic driving mode) and at least one data item of the weight, length, width and height of the trailer 4 exceeds a respective predetermined threshold value, the automatic driving control part 102 determines the degree of limitation control which limits the execution of the automatic driving control operation. The limitation control makes it possible to allow the driver of the truck tractor 2 to perform the manual driving of the truck tractor 2 and to take countermeasures against danger caused by performing the full automatic driving control operation. For example, it is possible for the driver of the truck tractor 2 to stop the truck tractor 2 moving.

In the structure of the vehicle control device 10 according to the exemplary embodiment, the hauling determination part 101 obtains the weight information of the trailer 4 on the basis of a predetermined weight value of the trailer 4 determined when the trailer 4 does not carry a load (in a non-loading state) or a measured weight value obtained when the trailer 4 carries a load in a loading state).

When obtaining the predetermined weight value of the trailer 4, the vehicle control device 10 may obtain the weight information of the trailer 4 without performing the measurement operation.

Further, it is possible for the vehicle control device 10 according to the exemplary embodiment to obtain the accurate weight information of the trailer 4 which has been measured by using the weight sensor when receiving the weight information of the trailer 4 transmitted from the trailer 4.

As previously described, it is possible for the vehicle control device 10 to receive the predetermined weight value or the measured weight value as the weight information of the trailer 4. This makes it possible to obtain the weight information of the trailer 4 when the trailer 4 has no weight sensor. Further, this makes it possible to obtain the accurate weight information of the trailer 4 when the trailer 4 has the weight sensor.

In the structure of the vehicle control device 10 according to the exemplary embodiment, the hauling determination part 101 obtains the length information of the trailer 4 as the trailer data on the basis of an overall length of the trailer 4 or a rear wheel side length of the trailer 4 measured to the rear wheels of the trailer 4 from the connection point (or a connection pin as the connection mechanism) through which the trailer 4 is connected to the truck tractor 2.

It is possible for the vehicle control device 10 to obtain the length information of the trailer 4 or to calculate the length information of the trailer 4 on the basis of the overall length value of the trailer 4. This makes it possible for the vehicle control device 10 to transmit the correct instruction to the steering angle control device 30 on the truck tractor 2 so as to correctly control the behavior of the truck tractor 2. For example it is possible for the vehicle control device 10 to determine the steering start timing with high accuracy when the truck tractor 2 enters a curve of the road. It is acceptable for the vehicle control device 10 to use a predetermined rear wheel side length and a predetermined overall length of the trailer 4, or to determine the rear wheel side length and the overall length of the trailer 4 on the basis of the trailer data transmitted from the trailer information transmission device 40.

In the structure of the vehicle control device 10 according to the exemplary embodiment, when the hauling determination part 101 does not detect the state in which the truck tractor 2 is hauling/pulling the trailer 4, or when the hauling determination part 101 does not receive the trailer data transmitted from the trailer 4, the automatic driving control part 102 limits the execution of the automatic driving control operation in the second automatic driving mode.

When the hauling determination part 101 does not detect the state in which the truck tractor 2 is hauling/pulling the trailer 4 or when the vehicle control device 10 receives no trailer data, i.e. does not receive the weight, length, width and height of the trailer 4 transmitted from the trailer 4 side, the vehicle control device 10 limits the execution of the automatic driving control operation of the truck tractor 2. This makes it possible to provide safe driving of the truck tractor 2 which is hauling/pulling the trailer 4.

A description will be given of the vehicle control process performed by the vehicle control device 10 with reference to FIG. 2.

Figure 2:
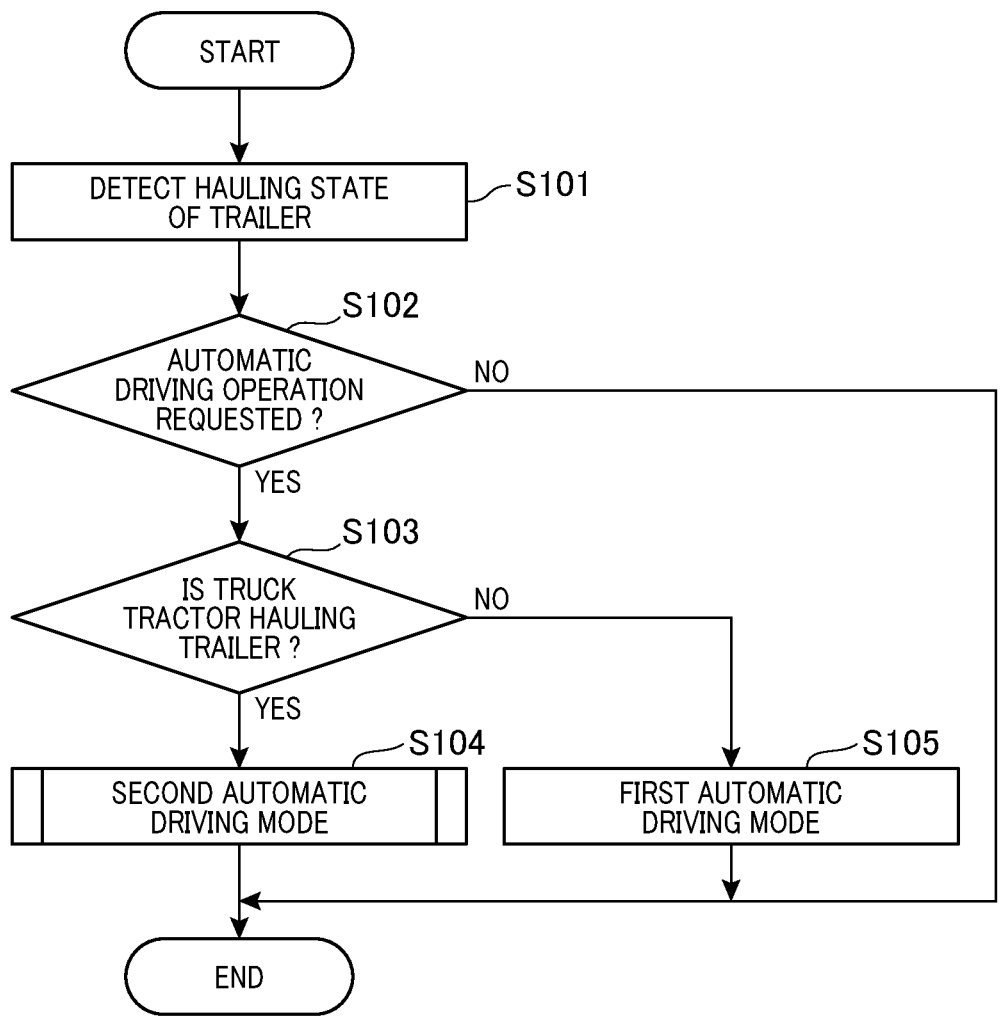
FIG. 2 is a flow chart showing a vehicle control process performed by the vehicle control device shown in FIG. 1.

FIG. 2 is a flow chart showing the vehicle control process performed by the vehicle control device 10 mounted on the truck tractor 2 shown in FIG. 1.

In step S101 shown in FIG. 2, the hauling determination part 101 detects the hauling state of whether the truck tractor 2 is hauling/pulling the trailer 4 as a hauling load. The operation flow progresses to step S102.

In step S102, the automatic driving control part 102 detects whether the automatic driving operation is requested. In the exemplary embodiment, the automatic driving mode is composed of the first automatic driving mode and the second automatic driving mode.

When the detection result in step S102 is positive ("YES" in step S102), i.e. represents that the truck tractor 2 is in the automatic driving mode, the operation flow progresses to step S103.

On the other hand, when the detection result in step S102 is negative ("NO" in step S102), i.e. represents that the truck tractor 2 is not in the automatic driving mode, the vehicle control device 10 finishes the vehicle control process shown in FIG. 2.

In step S103, the hauling determination part 101 detects whether the truck tractor 2 is hauling/pulling the trailer 4 as a hauling load.

When the detection result in step S103 is positive ("YES" in step S103), i.e. represents that the truck tractor 2 is hauling/pulling the trailer 4, the operation flow progresses to step S104.

On the other hand, when the detection result in step S103 is negative ("NO" in step S103), i.e. represents that the truck tractor 2 is not hauling/pulling the trailer 4, the operation flow progresses to step S105.

In step S105, the automatic driving control part 102 performs the first automatic driving mode in the automatic driving mode. In the first automatic driving mode, the automatic driving control part 102 performs the automatic driving control operation without detection of whether the truck tractor 2 is hauling/pulling the trailer 4.

In step S104, the automatic driving control part 102 performs the second automatic driving mode. In the second automatic driving mode, the automatic driving control part 102 performs the automatic driving control operation while detecting whether the truck tractor 2 is hauling/pulling the trailer 4.

A description will now be given of the second automatic driving mode with reference to FIG. 3.

FIG. 3 is a flow chart showing in a second automatic driving mode in the vehicle control process shown in FIG. 2.

In step S151 shown in FIG. 3, the automatic driving control part 102 performs the curved road processing process. A description will now be given of the curved road processing process with reference to FIG. 4.

FIG. 4 is a flow chart showing in the curved road processing process in the second automatic driving mode shown in FIG. 3.

In step S201 shown in FIG. 4, the driving route acquisition part 103 acquires a predicted route information. In more detail, the driving route acquisition part 103 receives navigation information transmitted from the navigation device 22, and obtains the predicted route information, for example, a current location of the truck tractor 2 on the map, a road shape of a predicted travel route on which the truck tractor 2 will travel on the basis of the received navigation information. The operation flow progresses to step S202.

In step S202 following after step S201, the driving route acquisition part 103 detects whether it is a curved road on the predicted travel route. When the detection result in step S202 is positive ("YES" in step S202), i.e. represents that there is a curved road on the predicted travel route, the operation flow progresses to step S230.

On the other hand, when the detection result in step S202 is negative ("NO" in step S202), i.e. represents that there is no curved road on the predicted travel route, the vehicle control device 10 finished the curved road processing process shown in FIG. 4. The operation flow progresses to step S152 shown in FIG. 3.

In step S203 shown in FIG. 4, the automatic driving control part 102 performs the travel locus change process.

FIG. 5A and FIG. 5B are views explaining a travel locus setting process performed by the vehicle control device 10 according to the exemplary embodiment when the truck tractor 2 enters a curve on a travel road. That is, FIG. 5A shows a travel locus L1 when only the truck tractor 2 travels on the curve on the travel road. On the other hand, FIG. 5B shows a travel locus L2 when the truck tractor 2 hauling the truck tractor 3 travels on the curve on the travel road.

When the truck tractor 2 enters the curve on the travel road shown in FIG. 5A and FIG. 5B, the automatic driving control part 102 changes or adjusts the travel locus on the basis of whether the truck tractor 2 is hauling/pulling the trailer 4 as the hauling load.

In the situation shown in FIG. 5A in which the truck tractor 2 is not hauling/pulling any hauling load, the automatic driving control part 102 generates the travel locus L1 which is close to the center line on the road.

On the other hand, in the situation shown in FIG. 5B in which the truck tractor 2 is hauling/pulling the trailer 4, the automatic driving control part 102 generates the travel locus L2 which is outside from the center line on the road when compared with the travel locus L1.

In step S204 following after step S203 shown in FIG. 4, the automatic driving control part 102 performs a steering angle change point process. The steering angle point process will be explained with reference to FIG. 6A, FIG. 6B and FIG. 6C.

FIG. 6A is a view showing a steering angle change point when only the truck tractor 2, which hauls no travel load, is traveling at a curve of the road. FIG. 6B is a view showing a steering angle change point when the truck tractor 2 which is hauling/pulling the trailer 4 is traveling at the curve of the road. FIG. 6C is a view showing a situation in which the truck tractor 2 which is hauling the trailer 4 is traveling at the curve on the road after passed through the steering angle change point shown in FIG. 6B.

When the truck tractor 2 travels at the curve on the road shown in FIG. 6A, FIG. 6B and FIG. 6C, the automatic driving control part 102 adjusts the steering angle charge point on the basis of the detection result of whether the truck tractor 2 is hauling/pulling the hauling load, e.g. the trailer 4.

As shown in FIG. 6A, when only the truck tractor 2 without the trailer 4 is travelling on the road, the automatic driving control part 102 uses the steering angle change point so that the truck tractor 2 will move, i.e. pass through near the center line on the curve of the road.

On the other hand, when the truck tractor 2 which is hauling the trailer 4 is travelling on the road, the automatic driving control part 102 delays a steering angle change timing by a predetermined time and changes the steering angle change point to a depth point on the curve of the road so that the truck tractor 2.

FIG. 6C shows the travel locus of the truck tractor 2 after the situation shown in FIG. 6B. As shown in FIG. 6C, because the truck tractor 2 has the travel locus which is outside of the curve of the road, the steering angle change process makes it possible to keep an adequate travel area of the trailer 4 in the inside of the curve of the road.

After the steering angle change point process in step S204 shown in FIG. 4, the operation flow returns to step S152 shown in FIG. 3.

In step S152, the automatic driving control part 102 performs the inter-vehicle distance adjustment process.

Figure 7:
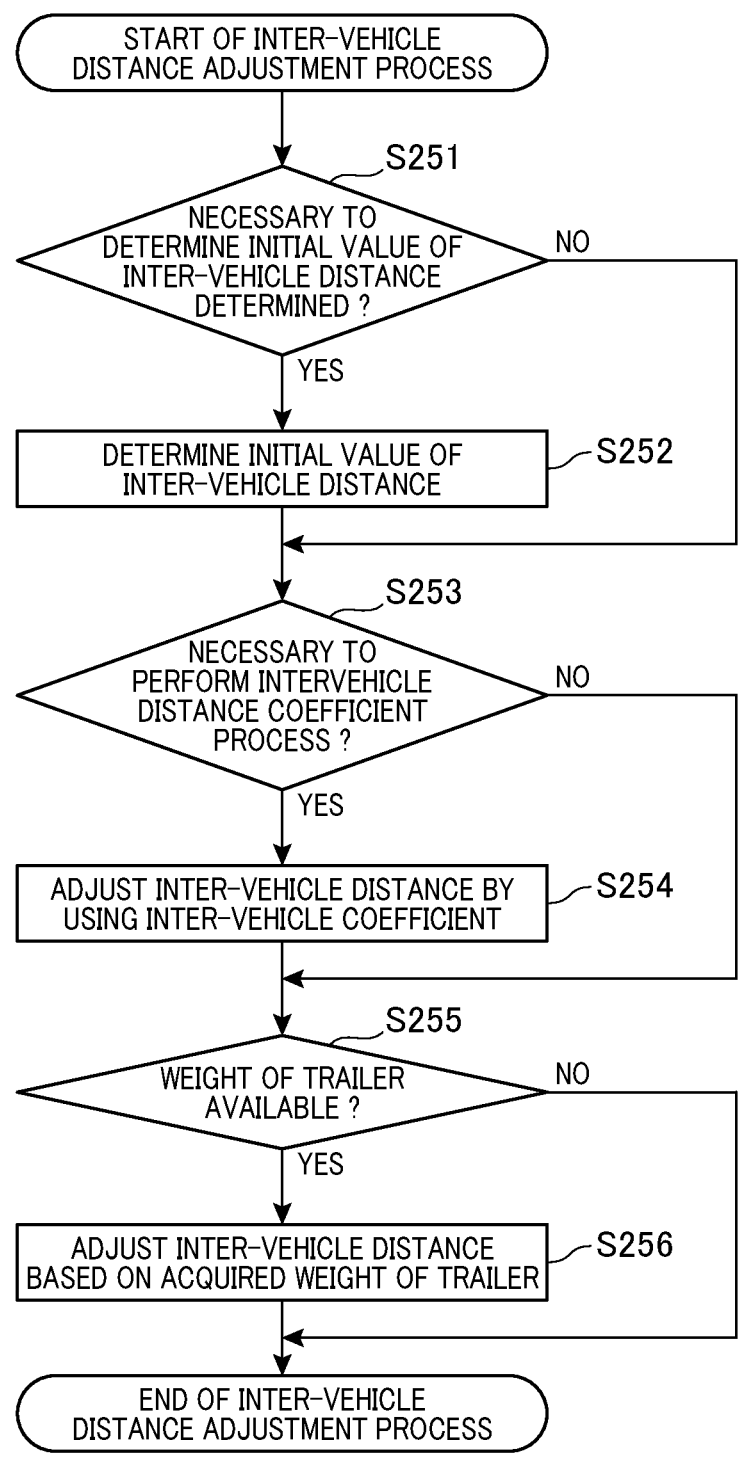
FIG. 7 is a flow chart showing an inter-vehicle distance adjustment process in the second automatic driving mode shown in FIG. 3.

A description will now be given of the inter-vehicle distance adjustment process with reference to FIG. 7. FIG. 7 is a flow chart showing the inter-vehicle distance adjustment process in the second automatic driving mode shown in FIG. 3.

In step S251 shown in FIG. 7, the automatic driving control part 102 detects whether it is necessary to determine an initial value of the inter-vehicle distance between the truck tractor 2 and a preceding vehicle.

The initial value of the inter-vehicle distance represents to increase the inter-vehicle distance when the truck tractor 2 is hauling/pulling the trailer 4 as a hauling load, which is longer than the inter-vehicle distance when only the truck tractor 2 travels without hauling the trailer 4.

When the detection result in step S251 is positive ("YES" in step S251), i.e. represents that it is necessary to determine the initial value of the inter-vehicle distance, the operation flow progresses to step S252.

On the other hand, when the detection result in step S251 is negative ("NO" in step S251), i.e. represents that it is not necessary to determine the initial value of the inter-vehicle distance, the operation flow progresses to step S253.

In step S252, the automatic driving control part 102 sets the inter-vehicle distance between the truck tractor 2 and the preceding vehicle 6 to the initial value of the inter-vehicle distance.

Figure 8A:
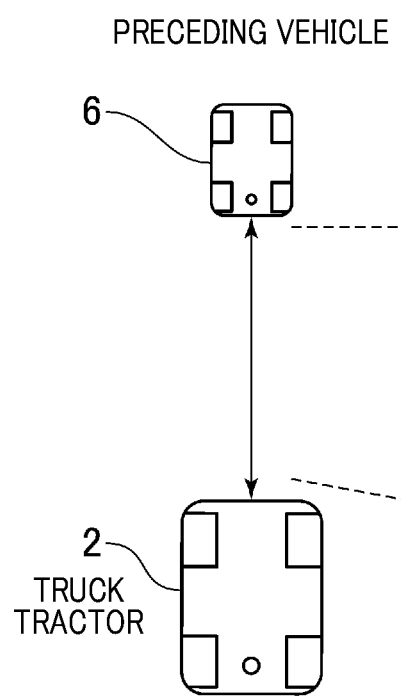
FIG. 8A and FIG. 8B are views explaining a braking process in the second automatic driving mode shown in FIG. 3.
Figure 8B:
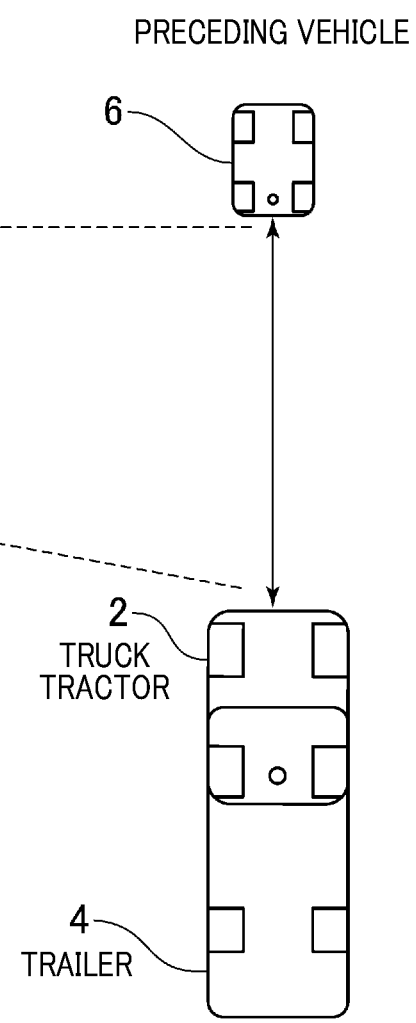

FIG. 8A and FIG. 8B are views explaining a braking process in the second automatic driving mode shown in FIG. 3. That is, FIG. 8A and FIG. 8B are view explaining the setting process of setting the inter-vehicle distance between the truck tractor 2 and the preceding vehicle 6. As shown in FIG. 8A, the automatic driving control part 102 increases the inter-vehicle distance between the truck tractor 2 and the preceding vehicle 6 when the truck tractor 2 is hauling/pulling the trailer 4 longer than the inter-vehicle distance to be used when only the truck tractor 2 without hauling the preceding vehicle 6 is travelling on the road. The initial value of the inter-vehicle distance is longer than the inter-vehicle distance to be used when only the truck tractor 2 is travelling on the road shown in FIG. 8A.

In step S253 shown in FIG. 7, the automatic driving control part 102 detects whether it is necessity to perform an inter-vehicle distance coefficient process. The automatic driving control part 102 performs the inter-vehicle distance coefficient process so as to increase the inter-vehicle distance on the basis of the driving situation. That is, the initial value of the inter-vehicle distance is a fixed value. On the other hand, the inter-vehicle distance coefficient process multiplies the inter-vehicle distance with a predetermined coefficient so as to increase the inter-vehicle distance.

When the detection result in step S253 is positive ("YES" in step S253), i.e. represents that it is the necessity to perform the inter-vehicle distance coefficient process, the operation flow progresses to step S254.

On the other hand, when the detection result in step S253 is negative ("NO" in step S253), i.e. represents that it is no necessity to perform the inter-vehicle distance coefficient process, the operation flow progresses to step S255.

In step S254 shown in FIG. 7, the automatic driving control part 102 adjusts the inter-vehicle distance by using the inter-vehicle distance coefficient. In this case, the automatic driving control part 102 adjusts the inter-vehicle distance between the truck tractor 2 and the preceding vehicle 6 when the truck tractor 2 is hauling/pulling the trailer 4 which is longer than the inter-vehicle distance to be used when only the truck tractor 2 without hauling the preceding vehicle 6 is travelling on the road shown in FIG. 8A. That is, the inter-vehicle distance which has been adjusted by using the inter-vehicle distance coefficient shown in FIG. 8B becomes longer than the inter-vehicle distance shown in FIG. 8A. The operation flow progresses to step S255.

In step S255, the automatic driving control part 102 detects whether it is possible to acquire the weight information of the trailer 4.

When the detection result in step S255 is positive ("YES" in step S255), i.e. represents that it is possible to acquire the weight information of the trailer 4, the operation flow progresses to step S256.

On the other hand, when the detection result in step S255 is negative ("NO" in step S255), i.e. represents that it is difficult to acquire the weight information of the trailer 4, the automatic driving control part 102 finishes the inter-vehicle distance adjustment process shown in FIG. 7. In this case, the operation flow progresses to step S153 shown in FIG. 3.

That is, when the detection result in step S255 is positive ("YES" in step S255), the operation flow progresses to step S256. In step S256 shown in FIG. 7, the automatic driving control part 102 adjusts the inter-vehicle distance between the truck tractor 2 and the preceding vehicle 6 on the basis of the weight of the trailer 4. The heaver, the weight of the trailer 4 is, the longer the automatic driving control part 102 adjusts the inter-vehicle distance to be.

After the completion of step S256, the automatic driving control part 102 finishes the inter-vehicle distance adjustment process shown in FIG. 7. The operation flow progresses to step S153 shown in FIG. 3.

In step S153 shown in FIG. 3, the automatic driving control part 102 performs the driving and braking process.

Figure 9:
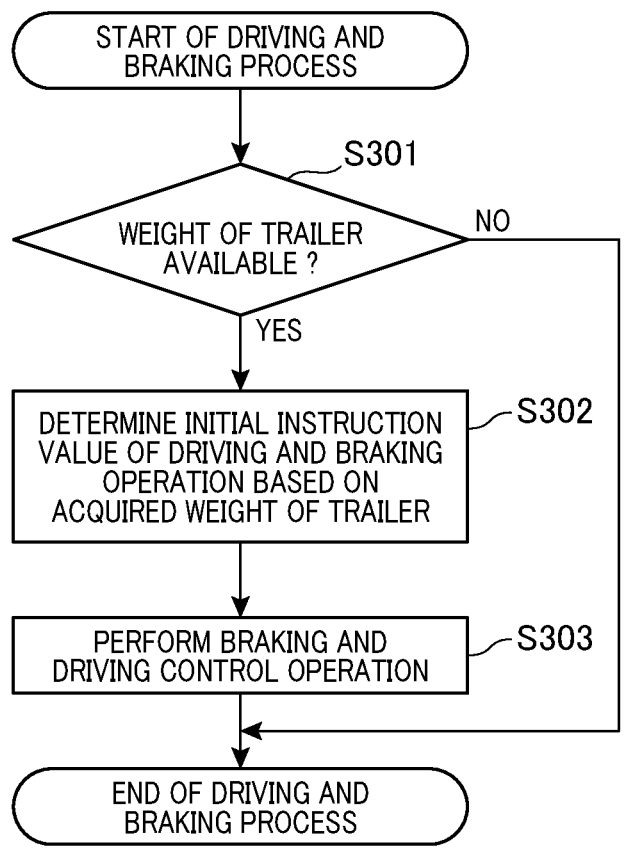
FIG. 9 is a flow chart showing a driving and braking process in the second automatic driving mode shown in FIG. 3.

A description will now be given of the driving and braking process with reference to FIG. 9. FIG. 9 is a flow chart showing a driving and braking process in the second automatic driving mode shown in FIG. 3.

In step S301 shown in FIG. 9, the automatic driving control part 102 detects whether the weight information of the trailer is available.

When the detection result in step S301 is positive ("YES" in step S301), i.e. represents that it is possible to acquire the weight information of the trailer 4, the operation flow progresses to step S302.

On the other hand, when the detection result in step S301 is negative ("NO" in step S301), i.e. represents that it is difficult to acquire the weight information of the trailer 4, the automatic driving control part 102 finishes the driving and braking process shown in FIG. 9. In this case, the operation flow progresses to step S154 shown in FIG. 3.

That is, when the detection result in step S301 is positive ("YES" in step S301), the operation flow progresses to step S302. In step S302, the automatic driving control part 102 determines an initial instruction value of a braking and driving control operation on the basis of the weight information of the trailer 4. The operation flow progresses to step S303.

In step S303, the automatic driving control part 102 performs the braking and driving control operation of the truck tractor 2 on the basis of the initial instruction value of the braking and driving control operation.

A description will be given of the determination of the initial instruction value of the driving and braking operation with reference to FIG. 10.

FIG. 10A and FIG. 10B are views explaining the driving process in the driving and braking process shown in FIG. 9.

At timing t1 shown in FIG. 10, the automatic driving control part 102 starts to perform the driving and braking process shown in FIG. 9.

When the truck tractor 2 is not hauling/pulling the trailer 4, the automatic driving control part 102 determines the initial instruction value of the driving and braking operation which is smaller than an instruction value which corresponds to a driving force necessary to drive an actual weight of the trailer 4. In this case, during the period from timing t1 to timing t2, an acceleration value and a vehicle speed of the truck tractor 2 obtained by the determined initial instruction value becomes smaller than a usual acceleration and vehicle speed of the truck tractor 2.

At timing t2, the vehicle control device 10 mounted on the truck tractor 2 starts to perform the feedback control. The feedback control increases the initial instruction value of the driving and braking operation. In this case, the acceleration of the truck tractor 2 rapidly increases. At timing t3, the vehicle speed of the truck tractor 2 overshoots the target speed in response to the weight information of the trailer 4. After timing t3, the acceleration of the truck tractor 2 is suddenly reduced due to the start of the feedback control.

That is, as previously described, the acceleration of the truck tractor 2 rapidly increases and the acceleration overshoots at timing t3. After timing t3, the automatic driving control part 102 remarkably reduces the instruction value of the driving and braking operation. Although the truck tractor 2 finally travels at the target vehicle speed, the rapid deceleration occurs after rapid acceleration and this causes uncomfortable driving of the truck tractor 2 due to the rapid acceleration and deceleration.

In order to avoid the uncomfortable driving of the truck tractor 2, the automatic driving control part 102 adjusts the initial instruction value of the driving and braking operation at timing t1. Specifically, when compared with the initial instruction value of the driving and braking operation to be used when the truck tractor 2 is not hauling/pulling the trailer 4, the automatic driving control part 102 adjusts the initial instruction value of the driving and braking operation while considering an additional weight value of the trailer 4 in addition to the overall weight value of the truck tractor 2 only. This makes it possible for the truck tractor 2 to smoothly reach the target acceleration value at timing t3 and possible to provide comfortable driving because the truck tractor 2 and the trailer 4 have smooth acceleration during the period counted from timing t1 to timing t3. It is acceptable to increase the acceleration of the truck tractor 1 at a constant rate or to multiply the initial instruction value of the driving and braking operation by a coefficient of more than 1 so as to provide smooth acceleration of the truck tractor 2.

It is possible to calculate an increment value ΔF of the initial instruction value of the driving and braking operation by using the following equations (f1), (f2) and (f3).

$$F_1 = M\ddot{x} + (a_1\dot{x}^2 + b_1\dot{x} + c_1) + Mg \sin \theta \quad (f1)$$

$$F_2 = (M+m)\ddot{x} + (a_2\dot{x}^2 + b_2\dot{x} + c_2) + (M+m)g \sin \theta \quad (f2)$$

and $$\Delta F = F_2 - F_1 = m\alpha + (a_2 - a_1)V^2 + (b_2 - b_1)V + (c_2 - c_1) + mg \sin \theta \quad (f3)$$

where $F_1$ represents a force at a tire point when the truck tractor 2 is not hauling/pulling the trailer 4, $F_2$ represents a force at the tire point of the truck tractor 2 which is hauling/pulling the trailer 4, $M^2$ is a weight of the truck tractor 2, m is a weight of the trailer 4, $a_1$ is a driving resistant coefficient (speed square term) when the truck tractor 2 is not hauling/pulling the trailer 4, $b_1$ is a driving resistant coefficient (speed term) when the truck tractor 2 is not hauling/pulling the trailer 4, $c_1$ is a driving resistant coefficient (stationary term) when the truck tractor 2 is not hauling/pulling the trailer 4, $a_2$ is a driving resistant coefficient (speed square term) when the truck tractor 2 is hauling/pulling the trailer 4, $b_2$ is a driving resistant coefficient (speed term) when the truck tractor 2 is hauling/pulling the trailer 4, $c_2$ is a driving resistant coefficient (stationary term) when the truck tractor 2 is hauling/pulling the trailer 4, g is gravitational acceleration, θ represents hill-climbing angle (positive: hill climbing, negative: hill descending), and x: position (primary derivation: vehicle speed, secondary derivation: acceleration).

When the truck tractor 2 requires an acceleration a at a vehicle speed V, it is acceptable to add an increment force ΔF to the driving force at the tire point of the truck tractor 2 when compared with that when the truck tractor 2 is not hauling/pulling the trailer 4. In this case, it is acceptable to use a function of the coefficients $a_2$, $b_2$ and $c_2$ corresponding to a detected weight of the trailer 4, an estimated weight of the trailer 4 or a front projection area. It is possible to calculate the braking force by using a similar procedure when the truck tractor 2 decelerates.

FIG. 11 is a view explaining the driving process in the driving and braking process shown in FIG. 9.

Instead of adding the increment force ΔF immediately following after the detection of the weight of the trailer 4 as shown in FIG. 11, it is acceptable to gradually add the additional weight to the weight of the trailer 4. This makes it possible to avoid a quick acceleration/deceleration of the truck tractor 2 due to occurrence of incorrect detection. As shown in FIG. 11, it is acceptable to continue this weighting process of adding the increment force ΔF of 1 until the current travel process is completed. When the travel of the truck tractor 2 restarts, it is acceptable to use the increment force ΔF of zero as the weight coefficient. In FIG. 11, it is acceptable to use a time or a travel distance as the parameter of the horizontal axis.

The automatic driving control part 102 finishes the driving and braking process shown in FIG. 9 after step S303 or when the detection result in step S301 is negative ("NO" in step S301). The operation flow progresses to step S154 shown in FIG. 3.

A description will be given of the automatic driving limitation process S154 with reference to FIG. 12.

Figure 12:
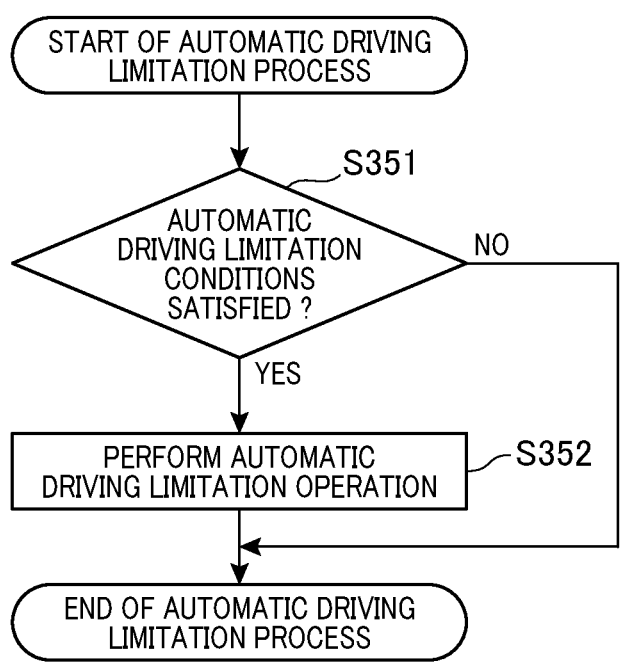
FIG. 12 is a flow chart showing an automatic driving limitation process in the second automatic driving mode shown in FIG. 3.

FIG. 12 is a flow chart showing the automatic driving limitation process in the second automatic driving mode shown in FIG. 3.

In step S351 shown in FIG. 12, the automatic driving control part 102 detects whether one or more automatic driving limitation conditions are satisfied. The automatic driving limitation conditions represent overweight, over length, over width, and over height conditions.

As shown in FIG. 13, the rear-side imaging camera 42 captures rear-side images so as to detect whether a load (e.g. a cargo container) projects toward the rear side of the trailer 4 from the identification mark 4a.

The automatic driving control part 102 detects whether the trailer 4 causes the over length situation on the basis of the rear-side images captured by the rear-side imaging camera 42.

The weight sensor 41 detects the weight of the cargo container placed in the trailer 4. The automatic driving control part 102 adds the weight of the trailer 4 itself and the detected weight of the cargo container so as to detect the overall weight of the trailer 4 and the cargo container.

When the overall weight of the trailer 4 and a load (e.g. a cargo container) exceeds a predetermined maximum load weight of the trailer 4, the automatic driving control part 102 detects occurrence of the overweight situation.

Figure 14:
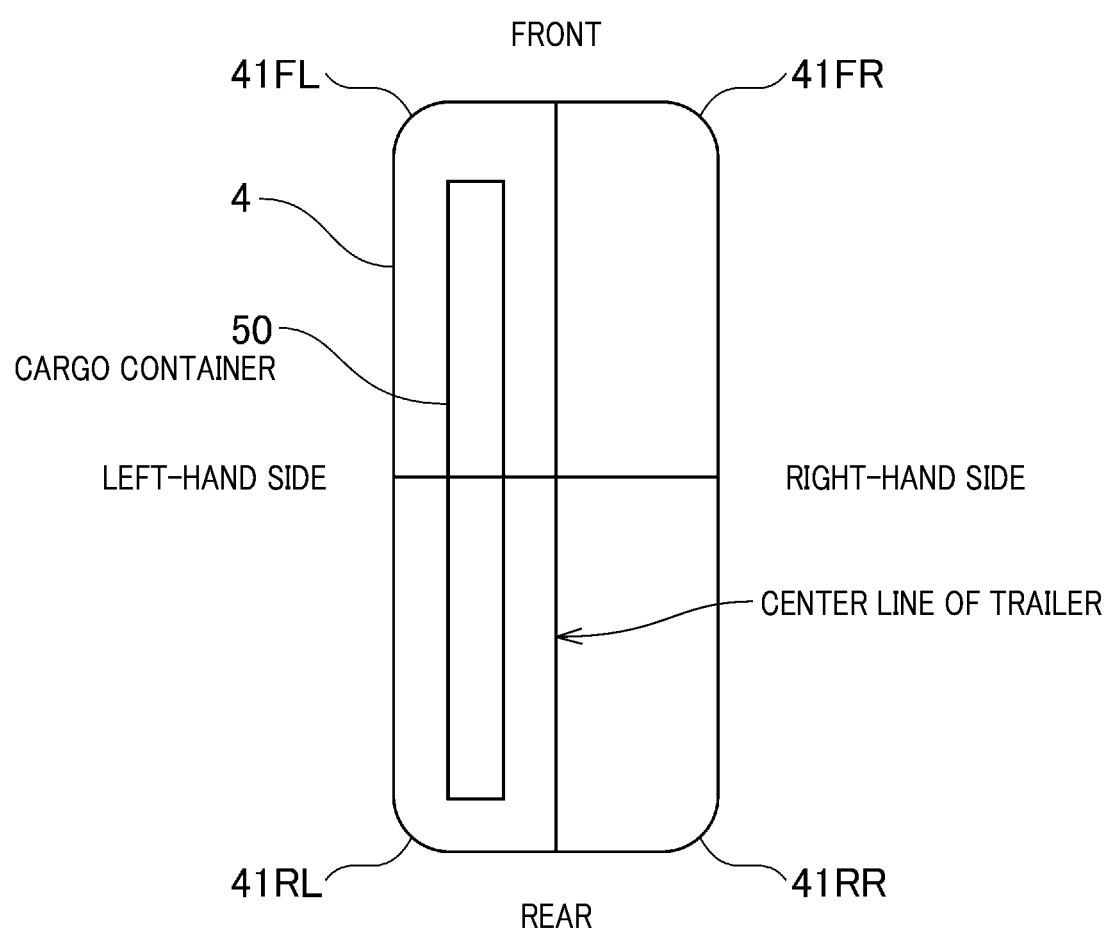
FIG. 14 a view showing a situation in which a load is placed at a left-hand side in the trailer and the four weight sensors are provided.

FIG. 14 a view showing a situation in which a cargo container 50 is placed at a left-hand side derived from the center line of the trailer 4 and the four weight sensors 41FL, 41FR, 41RL, and 41RR are provided. FIG. 15A to FIG. 15D are views explaining output values of the four weight sensors 41FL, 41FR, 41RL, and 41RR when the cargo container 50 is placed at the left-hand side in the trailer 4 shown in FIG. 14.

As shown in FIG. 14 and FIG. 15A to FIG. 15D, even if the cargo container 50 is placed at the left-hand side relative to the center line of the trailer 4, it is acceptable for the automatic driving control part 102 to determine that the automatic driving limitation condition is satisfied.

In the case shown in FIG. 14, the trailer 4 has four weight sensors composed of a front left-hand side weight sensor 41FL, a front right-hand side weight sensor 41FR, a rear left-hand side weight sensor 41RL and a rear right-hand side weight sensor 41RR.

The front left-hand side weight sensor 41FL is arranged at a front left-hand side of the trailer 4. The front right-hand side weight sensor 41FR is arranged at a front right-hand side of the trailer 4. The rear left-hand side weight sensor 41RL is arranged at a rear left-hand side of the trailer 4. The rear right-hand side weight sensor 41RR is arranged at a rear right-hand side of the trailer 4.

In the arrangement of the four weight sensors 41FL, 41FR, 41RL, and 41RR shown in FIG. 14, the cargo container 50 is placed at the left-hand side, i.e. deviated from the center line of the trailer 4.

Figure 15A:
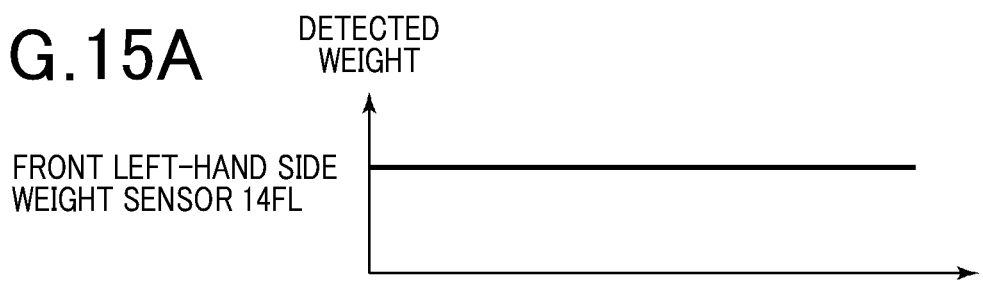
FIG. 15A to FIG. 15D are views explaining output values of the four weight sensors when a load is placed at the left-hand side in the trailer shown in FIG. 14.
Figure 15B:
Figure 15C:
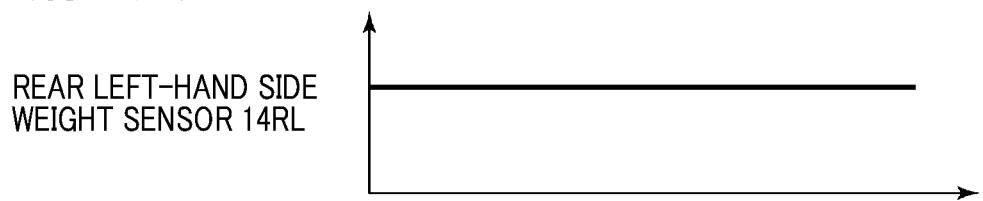
Figure 15D:
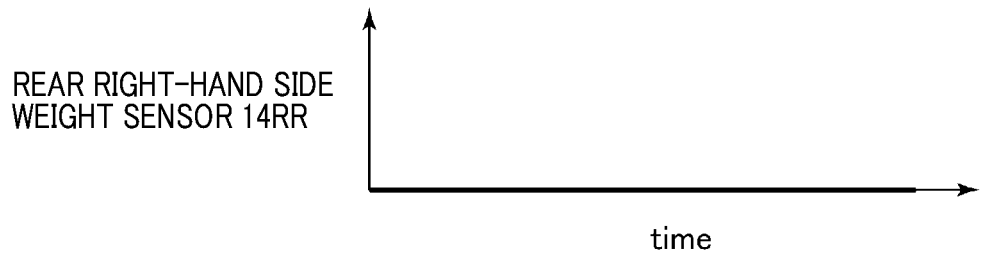

FIG. 15A to FIG. 15D shows output values of the front left-hand side weight sensor 41FL, the front right-hand side weight sensor 41FR, the rear left-hand side weight sensor 41RL and the rear right-hand side weight sensor 41RR. That is, FIG. 15A shows the output value of the front left-hand side weight sensor 41FL. FIG. 15B shows the output value of the front right-hand side weight sensor 41FR. FIG. 15C shows the output value of the rear left-hand side weight sensor 41RL. The FIG. 15D shows the output value of the rear right-hand side weight sensor 41RR.

As shown in FIG. 15A and FIG. 15C, the front left-hand side weight sensor 41FL and the rear left-hand side weight sensor 41RL output a high level value. On the other hand, as shown in FIG. 15B and FIG. 15D, the front right-hand side weight sensor 41FR and the rear right-hand side weight sensor 41RR output a low level value. Accordingly, the automatic driving control part 102 correctly detects that the cargo container 50 is deviated toward the left-hand side in the trailer 4 on the basis of the four weight sensors 41FL, 41FR, 41RL, and 41RR. It is therefore possible for the automatic driving control part 102 to detect that the automatic driving limitation conditions are satisfied.

A description will now be given of another case with reference to FIG. 16.

FIG. 16 is a view showing another situation in which the cargo container 50 (or a cargo) is placed at a right-hand side relative to the center line of the trailer 4, and the four weight sensors 41FL, 41FR, 41RL, and 41RR are provided. FIG. 17A to FIG. 17D are views explaining output values of the four weight sensors 41FL, 41FR, 41RL and 41RR when the cargo container 50 is placed at the right-hand side in the trailer 4 shown in FIG. 16.

Figure 17A:
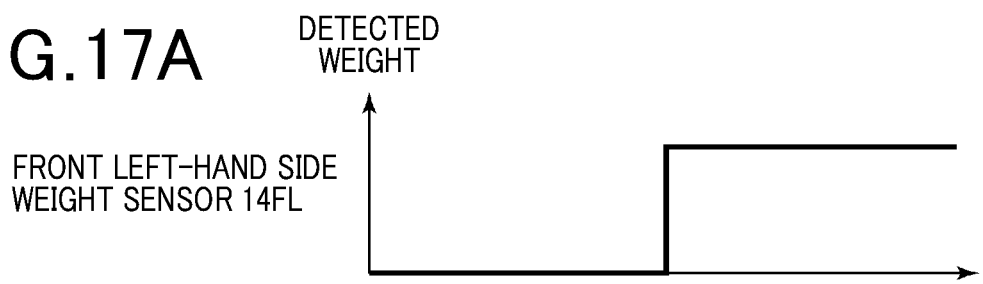
FIG. 17A to FIG. 17D are views explaining output values of the four weight sensors when the load is placed at the right-hand side in the trailer shown in FIG. 16.
Figure 17B:
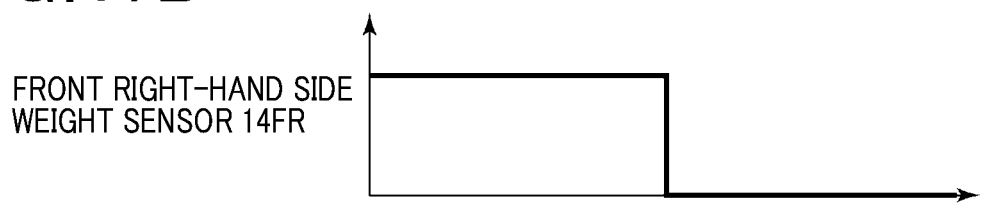
Figure 17C:

As compared with the case shown in FIG. 14 previously described, in the case shown in FIG. 16, the cargo container 50 is arranged at the right-hand side relative to the center line of the trailer 4. That is, FIG. 17A shows the output value of the front left-hand side weight sensor 41FL. FIG. 17B shows the output value of the front right-hand side weight sensor 41FR. FIG. 17C shows the output value of the rear left-hand side weight sensor 41RL. The FIG. 17D shows the output value of the rear right-hand side weight sensor 41RR.

Figure 17D:
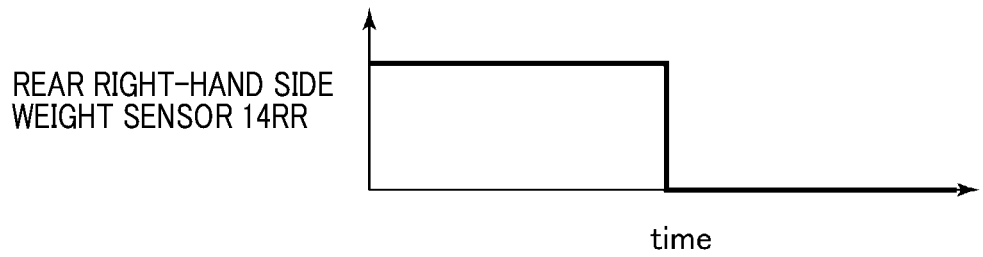

As shown in FIG. 17B and FIG. 17D, the output of the front right-hand side weight sensor 41FR is switched from a high level value to a low level value. Similarly, the output of the rear right-hand side weight sensor 41RR is switched from a high level value to a low level value.

On the other hand, as shown in FIG. 17A and FIG. 17C, the front left-hand side weight sensor 41FL is switched from a low level value to a high level value. Similarly, the output of the rear left-hand side weight sensor 41RL is switched from a low level value to a high level value.

Accordingly, the automatic driving control part 102 correctly detects that the cargo container 50 has been moved from the left-hand side to the right-hand side in the trailer 4 on the basis of the four weight sensors 41FL, 41FR, 41RL, and 41RR. It is therefore possible for the automatic driving control part 102 to detect that the automatic driving limitation conditions are satisfied.

When the detection result in step S351 shown in FIG. 12 is positive ("YES" in step S351), i.e. represents that the automatic driving limitation conditions are satisfied, the operation flow progresses to step S352.

On the other hand, when the detection result in step S352 is negative ("NO" in step S352), i.e. represents that the automatic driving limitation conditions are not satisfied, the automatic driving control part 102 finishes the automatic driving limitation process shown in FIG. 12.

In step S352, the automatic driving control part 102 performs the automatic driving limitation operation so as to allow the driver of the truck tractor 2 to operate the steering mechanism and/or to accelerate/decelerate the vehicle speed of the truck tractor 2 as a part of the functions of the automatic driving control process. It is also acceptable for the automatic driving limitation process to stop the overall functions of the automatic driving control process, and to allow the driver of the truck tractor 2 to perform the manual operation. After step S352, the automatic driving control part 102 finishes the automatic driving limitation process shown in FIG. 12.

Incidentally, there are various types of trailers, for example, truck trailers, travel trailers, trailer buses, etc., each of which is connected to a truck tractor having a driver's seat by using a connection mechanism such as a coupler, or a king pin. In addition, there are various possible cases, for example, in which a truck tractor having a driver's operation seat is hauling/pulling a truck tractor or a travel trailer.

In those cases, a truck tractor has front wheels and a trailer has rear wheels when the truck tractor is hauling/pulling the trailer, and a distance between the front wheels and the rear wheels and a turning radius difference become generally longer than those of a usual vehicle. In general, because a trailer has a structure of carrying many passengers and baggage, the weight of the trailer when carrying passengers and baggage is drastically heavier than that when carrying no passenger and baggage. This drastically affects the acceleration/deceleration of the truck tractor hauling the trailer. For example, a case when a truck tractor is hauling/pulling a plurality of trailers has these problems. Because related art does not consider characteristics of the trailer hauled by a truck tractor, this provides uncomfortable driving and dangerous accidents when the truck tractor hauling the trailer travels on a curved road, and accelerates/decelerates on a road.

In order to solve these problems, the present disclosure provides the drive control device according to the exemplary embodiment previously described in detail.

While the specific embodiment of the present disclosure has been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A vehicle control device, to be mounted on a truck tractor hauling a trailer, comprising:
    a computer system including a central processing unit, the computer system being configured to provide:
        a hauling determination part detecting whether the trailer is being hauled by the truck tractor; and
        an automatic driving control part switching an automatic driving mode between a first automatic driving mode and a second automatic driving mode on the basis of a detection result of the hauling determination part,
    the first automatic driving mode performing automatic driving that operates autonomously at least one of driving, braking and steering, a first value, indicative of at least one of control parameters, including an inter-vehicle distance between the truck tractor and another vehicle, to be used for performing the automatic driving in the first automatic driving mode, being determined in a state that the trailer is not being hauled by the truck tractor, the first value being a target value of the inter-vehicle distance in the first automatic driving mode,
    the second automatic driving mode performing automatic driving that operates autonomously at least one of driving, braking and steering, a second value, indicative of at least one of control parameters, including the inter-vehicle distance between the truck tractor and the other vehicle, to be used for performing the automatic driving in the second automatic driving mode, being determined in a state that the trailer is being hauled by the truck tractor and being different from the first value, the second value being a target value of the inter-vehicle distance in the second automatic driving mode,
    the first automatic driving mode being executed when the hauling determination part determines that the trailer is not being hauled by the truck tractor, the second automatic driving mode being executed when the hauling determination part determines that the trailer is being hauled by the truck tractor.

2. The vehicle control device according to claim 1, wherein
    the automatic driving control part performs an automatic driving control operation, and limits functions of the automatic driving control operation in the second automatic driving mode, and
    a degree of limitation of the automatic driving control operation in the second automatic driving mode is greater than a degree of limitation of the automatic driving control operation in the first automatic driving mode.

3. The vehicle control device according to claim 2, wherein
    the hauling determination part acquires trailer data including at least one data item of a weight, a length, a width and a height of the trailer, and
    the automatic driving control part limits the automatic driving control operation in the second automatic driving mode when at least one data item of the weight, length, width, height of the trailer represented by the trailer data exceeds a respective predetermined value.

4. The vehicle control device according to claim 2, wherein
    the hauling determination part acquires trailer data representing at least one data item of a weight, a length, a width and a height of the trailer,
    the automatic driving control part determines a degree of the automatic driving control operation in the second automatic driving mode on the basis of the acquired trailer data.

5. The vehicle control device according to claim 4, further comprising:

a driving route acquisition part which acquires predicted route information regarding a road shape of a predicted travel route on which the truck tractor will travel, wherein when the truck tractor enters a curved road having a curvature of not less than a predetermined curvature, the automatic driving control part performs a steering control on the basis of the acquired trailer data and the predicted route information so that a travel locus of the truck tractor hauling the trailer in the second automatic driving mode becomes different from a travel locus of the truck tractor hauling the trailer in the first automatic driving mode.

6. The vehicle control device according to claim 5, wherein when the truck tractor enters a curved road, the automatic driving control part performs a steering control so that a travel locus of the truck tractor hauling the trailer in the second automatic driving mode becomes different from a travel locus of the truck tractor hauling the trailer in the first automatic driving mode.

7. The vehicle control device according to claim 4, wherein the automatic driving control part determines at least one data item of a steering angle amount and a steering timing on the basis of the acquired trailer data in the second automatic driving mode.

8. The vehicle control device according to claim 4, wherein the automatic driving control part determines the target value of the inter-vehicle distance between the truck tractor and the other vehicle in the second automatic driving mode on the basis of the weight of the trailer represented by the trailer data, where the target value of the inter-vehicle distance in the second automatic driving mode becomes longer than the target value of the inter-vehicle distance in the first automatic driving mode.

9. The vehicle control device according to claim 4, wherein the automatic driving control part determines at least one data item of a driving operation value and a driving operation timing on the basis of the weight of the trailer represented by the trailer data in the second automatic driving mode.

10. The vehicle control device according to claim 4, wherein the automatic driving control part determines at least one data item of a braking operation value and a braking operation timing on the basis of the weight of the trailer represented by the trailer data in the second automatic driving mode.

11. The vehicle control device according to claim 4, wherein the automatic driving control part limits the automatic driving control operation in the second automatic driving mode when at least one data item of the weight, length, width and height of the trailer 4 represented by the trailer data exceeds a respective predetermined value.

12. The vehicle control device according to claim 4, wherein the hauling determination part obtains the weight of the trailer on the basis of a predetermined weight value of the trailer determined when the trailer does not carry a load or a measured weight value obtained when the trailer carries a load.

13. The vehicle control device according to claim 4, wherein the hauling determination part obtains the length of the trailer represented by the trailer data on the basis of an overall length of the trailer or a rear wheel side length of the trailer measured to rear wheels of the trailer from a connection point through which the trailer is connected to the truck tractor.

14. The vehicle control device according to claim 2, wherein the automatic driving control part limits the automatic driving control operation in the second automatic driving mode when the hauling determination part does not detect whether the trailer is hauled by the truck tractor, or when the hauling determination part acquires no trailer data.

15. The vehicle control device according to claim 4, wherein the automatic driving control part limits the automatic driving control operation in the second automatic driving mode when the hauling determination part does not detect whether the trailer is hauled by the truck tractor, or when the hauling determination part acquires no trailer data.

* * * * *